United States Patent [19]

Niwa et al.

[11] Patent Number: 4,615,091
[45] Date of Patent: Oct. 7, 1986

[54] METHOD OF AND APPARATUS FOR PROCESSING A SCROLL MEMBER FOR A SCROLL TYPE COMPRESSOR

[75] Inventors: Toshikazu Niwa; Mineo Takahashi; Kazumi Aiba, all of Shimizu, Japan

[73] Assignee: Hitachi, Ltd., Tokyo, Japan

[21] Appl. No.: 503,562

[22] Filed: Jun. 13, 1983

[30] Foreign Application Priority Data

Jun. 16, 1982 [JP] Japan ................................ 57-102028

[51] Int. Cl.$^4$ ...................... B23P 15/00; B23P 15/42; B23B 27/22
[52] U.S. Cl. ................................ 29/156.4 R; 407/14; 407/17; 407/18; 408/17; 408/146; 418/55
[58] Field of Search ................... 29/156.4 R, 156.8 R, 29/156.8 B, 156.8 CF, 156.8 FC; 407/12-19, 63; 418/55; 408/54, 146, 17, 700; 409/264, 265, 281, 282, 305, 313, 314, 345, 249, 293, 244, 280; 82/DIG. 9

[56] References Cited

U.S. PATENT DOCUMENTS

| | | | |
|---|---|---|---|
| 2,452,211 | 10/1948 | Rosenthal | 408/700 X |
| 3,091,060 | 5/1963 | Giegerich et al. | 408/17 X |
| 3,580,136 | 12/1968 | Bodine | 408/17 X |
| 3,619,671 | 11/1971 | Shoh | 408/17 X |
| 3,803,977 | 4/1974 | Psenka et al. | 409/60 X |
| 3,994,635 | 11/1976 | McCullough | 418/55 |
| 4,436,465 | 3/1984 | Fukushima et al. | 407/12 X |
| 4,436,495 | 3/1984 | McCullough | 29/156.4 R X |
| 4,441,870 | 4/1984 | Ikegawa et al. | 418/55 |
| 4,487,560 | 12/1984 | Uchikawa et al. | 418/55 |

FOREIGN PATENT DOCUMENTS

| | | | |
|---|---|---|---|
| 148085 | 9/1982 | Japan | 29/156.4 R |
| 149030 | 9/1982 | Japan | |
| 256465 | 9/1976 | U.S.S.R. | 408/700 |

*Primary Examiner*—Howard N. Goldberg
*Assistant Examiner*—R. S. Wallace
*Attorney, Agent, or Firm*—Antonelli, Terry & Wands

[57] ABSTRACT

A method of processing a scroll member having a spiral wrap and an end plate which is conducted by effecting a shaving on at least one side surface of the spiral wrap by a tool while applying to the tool both of an axial small force and an ultrasonic oscillation simultaneously. An apparatus is proposed which comprises a shaving tool having a spiral groove of the same configuration as the spiral wrap, and a cutting edge portion formed on at least one side edge of the groove over the entire length of the side edge. A tool supporting device supports the shaving tool, and a blank supporting device supports a scroll blank such that the scroll blank opposes to the shaving tool. A device is connected to the tool supporting means and is adapted to impart to the tool a pressing force necessary for effecting the shaving, and an ultrasonic oscillation generating device is adapted to impart an ultrasonic oscillation to one of the tool or the blank.

8 Claims, 13 Drawing Figures

METHOD OF AND APPARATUS FOR PROCESSING A SCROLL MEMBER FOR A SCROLL TYPE COMPRESSOR

BACKGROUND OF THE INVENTION

The present invention relates to a method of and apparatus for processing scroll members of scroll type fluid machines which are used as compressors or expanders for gases such as air, refrigerant and so forth.

The scroll type compressor is disclosed, for example, in U.S. Pat. No. 4,065,279, wherein a stationary scroll member and an orbital scroll member assembled together, with the orbital scroll member being driven to make an orbital movement with respect to the stationary scroll member to progressively decrease the volume of fluid chamber to thereby compress and discharge the fluid.

In the scroll type fluid machines of the aforementioned type, the stationary and orbital scroll members have respective spiral wraps the walls of which make contact with each other so as to define a closed space serving as the working fluid chamber. The point of contact between the spiral wrap walls of the scroll members, sealing the working fluid chamber, is gradually changed to progressively decrease the volume of the chamber to raise the pressure of the fluid in the chamber. It is, therefore, essential that the side walls of the spiral wraps and contact surfaces of the end plates of the scroll members are finely finished.

To cope with this demand, fine surface finishing or processing has been accomplished by an end mill cutter. In the final processing of the spiral wrap surfaces with an end mill cutter, it is necessary to move the cutter relatively to the wrap along the involute form of the latter, from the center to the periphery and vice versa. This method inconveniently necessitates independent processings for the inner and outer surfaces of the wrap, requiring much time and labor. Thus, the final processing with end mill cutter is not suitable for the mass production of the scroll members and, cannot assure satisfactory finishing particularly on the side surfaces of the wraps.

As means for eliminating the above-described problems of the prior art, Japanese Patent Laid-Open No. 149030/1982, corresponding to U.S. patent application Ser. No. 239,414, proposes a processing method in which a broaching tool, having a cutting edge of the same shape as the involute form of the stationary or orbital scroll member, is moved in the axial direction of the scroll member along the side surface of the latter to effect the final processing. It will be clear to those skilled in the art that this method can considerably shorten the processing time as compared with the conventional method which employs the end mill cutter. When each side wall of a wrap is processed independently by this processing method, however, the cutting edge of the broaching tool is made to contact with the wrap side wall while making angular indexing for several times until the desired size and state of finish is attained. For effecting the broaching on both side walls simultaneously, it is necessary to use a series of broaches. Thus, this method still requires an impractical long time. For processing the wraps having involute forms.

A considerably large resistance will be encountered during simultaneous processing on both side walls of a wrap by tools having cutting edges of the same involute forms as the wrap side surfaces. The large resistance inevitably requires a large pressing force which, in turn, requires a larger size of the pressurizing apparatus. In order to conduct the processing with minimum pressurizing force on the cutting edges, it is advisable to increase the number of cutting cycles while decreasing the amount of material removed in each cutting cycle. Such measure, however, is not preferred from the view point of shortening of the processing time. In addition, an increased processing time inconveniently shortens the life of the cutting tool. In fact, it is not possible to finish the wrap side surface at a sufficiently high precision with a cutting tool after a long use. In order to achieve sufficiently high precision of the finished surfaces with a single tool for a number of scroll members, it is necessary to prolong the life of the tool by shortening the processing time while reducing the amount of material removed and, at the same time, decreasing the required cutting pressure.

SUMMARY OF THE INVENTION

Accordingly, an object of the invention is to provide an improved method of processing side surfaces of spiral wraps of scroll members.

Another object is to provide a processing apparatus having a reduced size.

To these ends, according to the invention, the processing of scroll members is accomplished in a manner explained hereinunder.

A blank of the scroll member is fabricated either by preparing the spiral wrap and a flat end plate separately and joining them together or, alternatively, by die casting to form the wrap and the end plate integrally with each other from the beginning. The blank is formed with a small tolerance to leave minimal margin for the finishing. The processing is completed in one step within quite a short period of time by a shaving conducted along the wrap side wall by a cutting tool while imparting an ultrasonic oscillation and a small pressing force to the cutting tool in the axial direction of the scroll member. The ultrasonic oscillation and the pressing force may be imparted to the blank independently of the cutting tool. The shaving is completed so as to form a step in each side surface of the wrap leaving an unprocessed portion near the end plate. Then, a spiral strip of a width slightly smaller than the width of the spiral groove between wrap walls is fitted in the step, or the bottom portion of the spiral groove defined between the unprocessed portions of the side walls. The strip fitted in one of the scroll members is made to contact with the flat end surface of the wrap of the other scroll member to achieve a sealing function. It is, therefore, not necessary to process the surface of the end plate of the blank of the scroll member. The tool used in carrying out the method of the invention is a forming tool having a configuration identical to the involute form of the wrap, and has a cutting edge at least on one edge of an involute groove along the entire length of the involute edge. With this tool, it is possible to process one or both of the side surfaces of a wrap. The forming tool will be worn down during a long use to become unable to exhibit the initial cutting performance and to reduce the precision of the finished surface. In such a case, the forming tool can be regenerated simply by a grinding of the cutting edge for repeated use. When such a regenerated forming tool is used, the distance between the cutting edges on both sides of the spiral groove is measured and the tool is rotated and relocated in accordance with the measured distance, before starting the processing. This method requires only one tool, unlike the broching which employs a plurality of tools of different sizes.

The invention in another aspect provides a processing apparatus suitable for carrying out the method explained hereinbefore. The processing apparatus comprises: a shaving tool having a spiral groove of the same configuration as the spiral wrap, and a cutting edge portion formed on at least one side edge of the groove over the entire length of the side edge; a tool supporting means for supporting the shaving tool; a blank means for supporting a scroll blank such that the scroll blank opposes the shaving tool; a means connected to the tool supporting means and adapted for imparting to the tool a pressing force necessary for the shaving; and an ultrasonic vibration generating means adapted to impart an ultrasonic vibration to the tool.

With this apparatus, it is possible to finish the wrap side surface at once in quite a short period of time.

The above and other objects, features and advantages of the invention will become clear from the following description of the preferred embodiment taken in conjunction with the accompanying drawings.

DESCRIPTION OF THE PREFERRED EMBODIMENTS

The present invention provides a method of and apparatus for processing side surface or surfaces of the wrap of a scroll member at once in quite a short period of time by shaving. A considerably large pressing force will be required when the number of turns of the spiral wrap are large and, hence, the overall length of the wrap are large. It is quite an efficient way to decrease the pressing force for attaining longer tool life and reducing the size of the apparatus as a whole.

Figure 1:
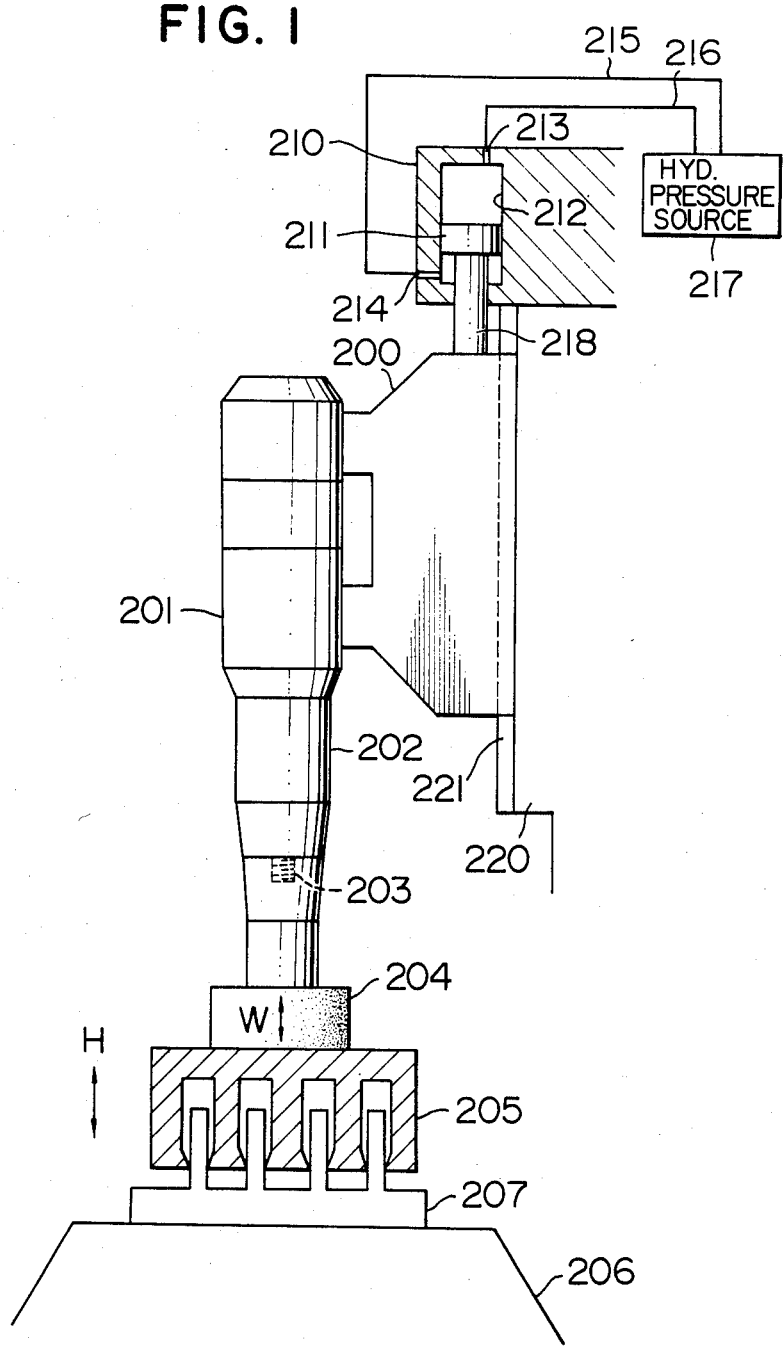
FIG. 1 is a side elevational view of a processing apparatus which is adapted to process a side surface of a scroll wrap by a tool under a pressing force and ultrasonic oscillation.

Referring now to the drawings wherein like reference numerals are used throughout the various views to designate like parts and, more particularly, to FIG. 1, according to this Figure, an apparatus for effecting a shaving by a cutting tool while imparting a small pressing force and ultrasonic oscillation to the cutting tool includes a head 200 to one end of which attached is an ultrasonic oscillation element 201. A horn 204 is attached to the oscillation element 201 by means of a cone 202 and a screw 203. A cutting tool 205, fashioned as a forming tool, is fixed to the horn 204 and is positioned above a scroll blank 207 located on and fixed to a work table 206.

A pressurizing device 210 has a piston 211 adapted to slide within a cylinder 212 into which oil passage ports 213 and 214 open. The oil passage ports 213 and 214 are connected to a hydraulic pressure source 217 through pipes 215 and 216. A spindle 218 connects the piston 211 to the head 200 so that the head 200 is adapted to be moved vertically along a slide guide 221 provided on the body 220 of the apparatus.

Figure 2:
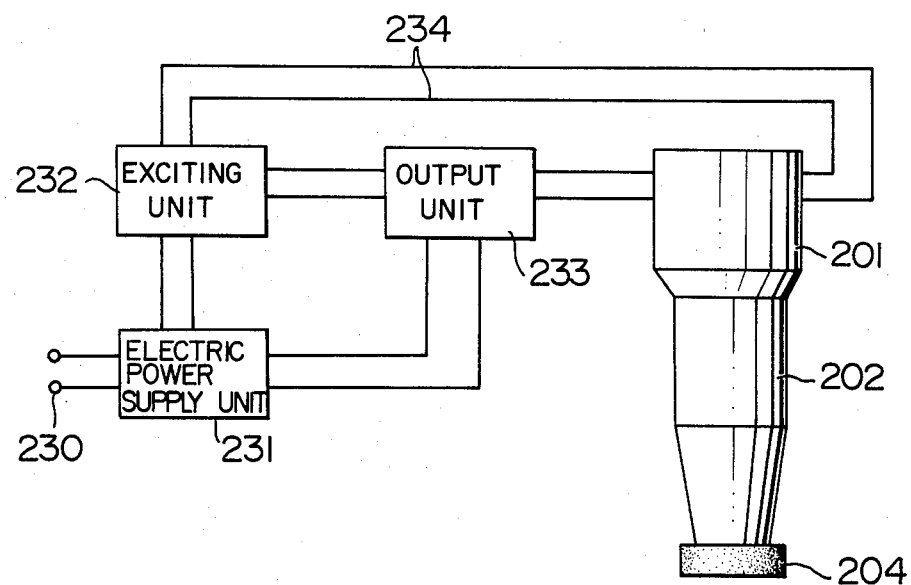
FIG. 2 is a control system diagram for explaining the control system of the processing apparatus of the invention.

As shown in FIG. 2, a connection 230 is provided for an electric power supply unit 231 which includes a rectifier circuit and an output adjusting circuit. An exciting unit 252 is connected to an output unit 233 and includes an oscillation circuit, drive circuit and a circuit for automatically adjusting the amplitude and phase. The output unit 233 is an amplifier circuit for obtaining the desired amplitude which is to be applied to the ultrasonic oscillation element 201. A data feedback circuit 234 is adapted to feed the data concerning the oscillation phase of the ultrasonic oscillation element 201 back to the exciting unit 232.

In operation, a shaving is conducted by the forming tool 204 while applying to the latter both of the small pressing force generated by the pressurizing device 210 and the ultrasonic oscillation W. In general, a relationship expressed by the following formula exists among the critical cutting speed V (m/min), amplitude A ($\mu$m) of the ultrasonic oscillation and the frequency F (KHz) of the same.

$$V = 0.377\,A\,F$$

Assuming here that the amplitude A is 15 $\mu$m and that the frequency F is 17.7 KHz, the critical processing speed V is calculated to be 100 m per minute which is much higher than that offered by the prior and conventional arts explained before. The method of the invention provides, besides the increased processing speed, a reduction in the resistance encountered during processing. Thus, the described embodiment of the invention offers various advantages such as shortening of the processing time, long life of the tool, reduction in size and weight of the apparatus and a reduction in the production cost of the apparatus, as well as a superior performance which ensures a high precision and smoothness of the processed surface.

Figure 3:
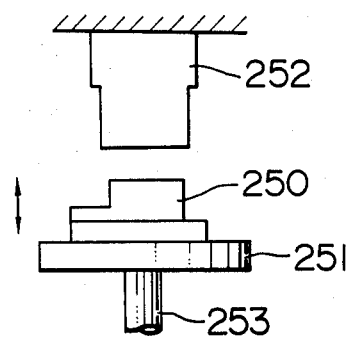
FIG. 3 is an illustration of another processing method.

In FIG. 3, the shaving is conducted by moving the work table to which the blank 250 is fixed, while keeping stationary the forming tool 252. In this case, the connecting shaft 253 is connected to the spindle of the pressurizing device actuated by the hydraulic pressure supplied from the hydraulic pressure source.

Figure 4:
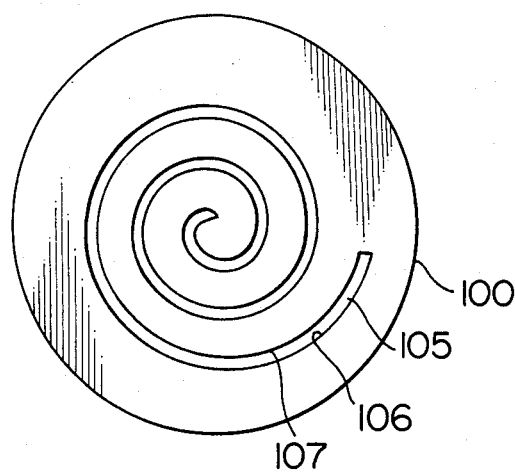
FIG. 4 is a plan view of a forming tool as used in the method of the invention.
Figure 5:
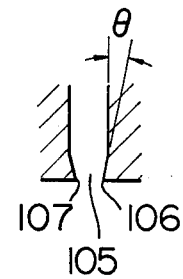
FIG. 5 is an enlarged sectional view of the cutting edge of the forming tool shown in FIG. 4.

The forming tool 100 of FIG. 4 includes an involute groove 105 of a form complementary to the form of the spiral wrap of the scroll member to be processed. Cutting edges 106 and 107 are formed on the marginal edges of the groove 105. The lip clearance $\theta$ of the cutting edge is selected to range between zero and several degrees. If the whole part of the wrap is formed in an involute form, the cutting edges 106 and 107 also are shaped wholly in involute form. However, if the wrap of the scroll member has a configuration which is a combination of an involute curve and arcs, the cutting edges are made to have corresponding curves consisting of involute curve and arcs. In such a case, the arcs are formed at the starting and terminal ends of the wrap. It is to be noted also that other types of curve can be used in place of the involute curve.

Figure 6:
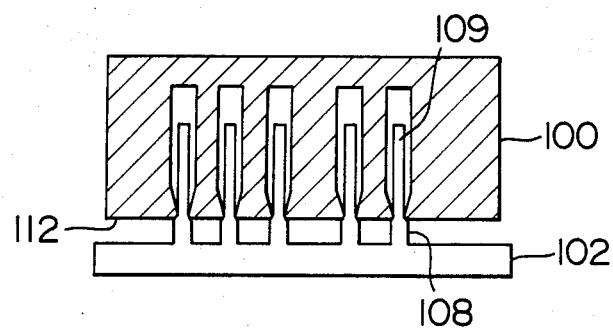
FIG. 6 is sectional views of a forming tool and a scroll blank under processing.

FIG. 6 provides an illustration of a scroll blank under processing, in which a wrap blank 108 is finished into final size to obtain a spiral wrap 109. It is confirmed that this final processing can be completed in quite a short period of time, on the order of several seconds.

Figure 7:
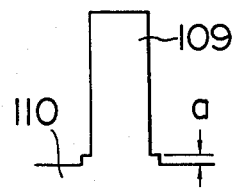
FIG. 7 shows the wrap after the processing.
Figure 8:
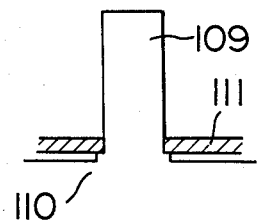
FIG. 8 shows an embodiment of the invention.

As shown in FIG. 7 the processing is completed leaving an unprocessed portion of an extremely small axial height (a) from the plane of the end plate 110. Then, a flat strip 111 which has been finished separately is fitted in the groove of the scroll member. This strip 111 makes a close contact with the flat end surface of the wrap of the other scroll member to achieve a sufficiently strong gas tightness therebetween.

The foregoing description is made on an assumption that the shaving is effected on an integral scroll blank having a wrap and an end plate unitary with each other from the beginning. This, however, is not exclusive and the invention can be applied also to the production of a scroll member in which an end plate and a wrap are formed separately and then bonded together. In such a case, needless to say, the shaving of the spiral wrap can be made without leaving any unprocessed portion, although an additional step is required for forming a groove in the end plate 110 for fitting the spiral wrap 109.

The cutting performance of the cutting edges 106 and 107 of the forming tool 100 are gradually deteriorated as the tool is used for a long time for a lot of blanks. In such a case, it is possible to recover the cutting performance by grinding the cutting edges 106, 107 of the forming tool 100. The grinding is made on the surface 112 of the forming tool 100, and can be accomplished quite easily because the surface 112 is completely flat.

Figure 9:
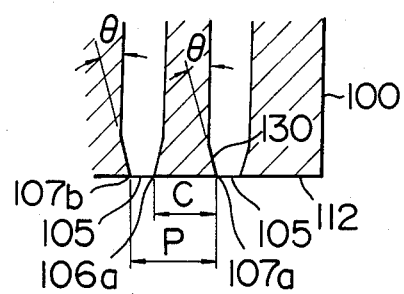
FIGS. 9 and 10 are partial sectional views of forming tools.
Figure 10:
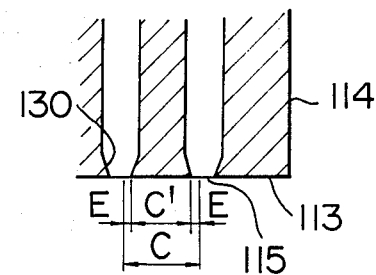
Figure 11:
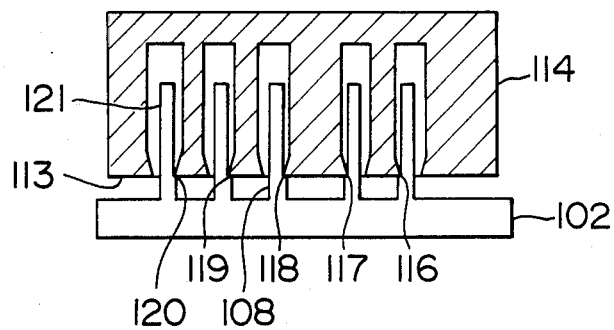
FIG. 11 is a sectional view of a forming tool in a repeated use after a grinding and a scroll blank under processing.

In the case of a forming tool in which the lip clearance is not zero, the width of the involute groove 105 is increased as the cutting edges 106 and 107 are ground for recovering the cutting performance, as will be seen from FIGS. 9 and 10. Referring to FIG. 9, since the lip angles of two adjacent grooves 105 are equal, the distance or pitch P (mm) between the ends 107a and 107b of the cutting edge are unchanged even when the surface 112 is ground. In FIGS. 9 and 10, a symbol C shows the distance or pitch between the ends 107a and 106a of the cutting edges on the surface 112 before the grinding, while C' represents the distance between the ends of the cutting edges on the surface 113 of the forming tool 114 after the grinding. It will be seen that the width of the involute groove 115 is increased by an amount 2E, where E represents an offset amount (mm). Clearly, it is not possible to shave both side surfaces of a wrap simultaneously precisely into final size. Therefore, the forming tool 114 regenerated by grinding after a long use for successive blanks is used as a tool for shaving only one side wall of the wrap at a time. FIG. 11 shows a scroll blank under processing only at one side surface of the scroll wrap by a regenerated forming tool. It will be seen that only one of the cutting edge on the ground surface 113 makes contact with the associated side wall of the wrap blank 108 of the scroll blank 102 to cut this side surface.

Figure 12:
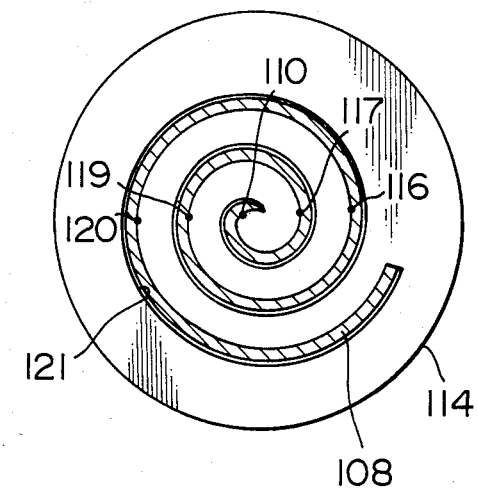
FIG. 12 is a plan view showing the state of processing with a tool under repeated use after a grinding.
Figure 13:
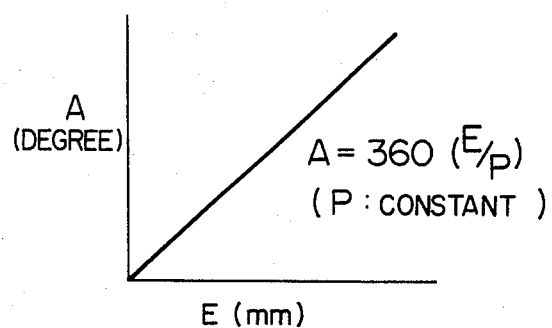
FIG. 13 is a diagram showing the relationship between the offset amount and rotation angle.

In FIG. 12 points of contact 116, 117, 118, 119 and 120 are provided between the cutting edge and the side wall of the wrap blank 108. After the processing of one side surface of the wrap blank 108, the processing is conducted on the other side surface 121 of the same. To this end, it is necessary to rotate the forming tool 114 or the work table 103 to which the scroll blank 108 is attached, to thereby to relocate the forming tool 114 with respect to the scroll blank 108. The angle of rotation for this relocating should be selected such that the cutting edge attacks the wrap blank 108 at such a depth as to just remove the finishing margin. This angle is in proportion to the offset amount E (mm) mentioned before. The relationship between the offset angle (A) and the offset amount (E) can easily be derived from the diagram shown in FIG. 13. Namely, since the pitch P is constant, the angle A is given by the following equation.

$$A = 360 \, (E/P)$$

The angle A, therefore, is changed linearly in accordance with a change in the offset amount E. For actually determining the offset angle, it is necessary to actually measure the offset amount E (mm). The measurement can be made easily because the offset angle A is the angle around the base circle of the involute curve.

Regardless of whether the processing is effected on either one side surface or both side surfaces of the wrap, it is advisable to slightly rotate the forming tool 114 or the scroll member in the opposite direction to the direction of rotation for relocating, in advance to the separation of the tool from the finished wrap. By so doing, a slight gap is left between the forming tool and the finished wrap to permit the separation without causing any damage on the finished side surface or surfaces.

As will be understood from the foregoing description, the offset amount E (mm) is gradually increased as a result of repeated grinding of the cutting edges. The increase of the offset amount, however, does not impose any problem in the processing although the relocating rotation angle is changed progressively. In addition, the forming tool can be used repeatedly as desired by repetitional grinding, because a large grinding margin is preserved in the direction of the lip surface 130. The grinding can be made without substantial difficulty as explained before because the ground surface is flat.

The groove of the forming tool intended for repetitional regeneration and use preferably has a form wholly consisting of an involute curve, for the following reason.

As stated before, the pitch or distance between two cutting edges is increased by 2E (E being offset amount in mm) as a result of a regenerating grinding, and the forming tool is relocated with respect to the scroll blank by rotating either one of the tool and the blank by the offset angle A. If the curve of the groove in the forming tool and the curve of the wrap of the scroll member wholly consist of involute curves, it is possible to bring whole part of the cutting edge uniformly into contact with the scroll blank.

In contrast, in the case where the curve of the scroll wrap includes arcs at the starting and terminal ends of the curve, parts of the wrap side surfaces along the arcuate portion remain unprocessed. The arc portions, however, do not impair the operation of the scroll type fluid machine even if they are not precisely finished, because such arc portions are not contacted by the wraps of the cooperating scroll members.

Although the invention has been described through specific terms, it is to be understood here that the described embodiments are not exclusive and various changes and modifications may be imparted thereto.

For instance, the curve of the wrap on each scroll member need not always be involute curve but the invention can equally be applied to the processing of scroll members having wraps of configurations consisting of any known curve used conventionally for the wraps of scroll members.

The forming tool used in the method of the invention has cutting edges formed on both side edges of a curved groove. Such forming tool, therefore, can be fabricated by combining and uniting by, for example, brazing two parts formed separately, i.e. an edge part made of a tool steel or the like material and having a thickness providing a suitable grinding margin and a base portion of a less-expensive material.

Other changes and modifications are still possible without departing from the scope of the invention which is limited solely by the appended claims.

What is claimed is:

1. A method of processing a spiral wrap of a scroll member, the method comprising the steps of precisely forming a blank into a shape approximating a final form of the spiral wrap by providing a small tolerance to leave a minimal margin for finishing, said blank having inner and outer side surfaces, cutting at least one side surface of the blank with a forming tool having at least one cutting edge of the same shape as the spiral wrap by effecting a shaving on the at least one side surface of said spiral wrap to finish the blank with one step of shaving while applying a small axial force to cause a relative axial movement of the tool and blank toward one another and simultaneously applying an ultrasonic oscillation of about 17.7 KHz to one of the forming tool and the blank.

2. A method as claimed in claim 1, wherein said blank is united to an end plate to form an integral scroll member before said cutting.

3. A method as claimed in claim 1, wherein said shaving is effected to form a step on said at least one side surface by leaving an unprocessed portion in the portion of said side surface near the end thereof.

4. A method as claimed in claim 1, wherein said tool is a forming tool having at least one cutting edge of a configuration equal to the involute spiral form of said spiral wrap.

5. A method as claimed in claim 1, wherein the inner and outer side surfaces of said blank are processed separately and independently.

6. A method as claimed in claim 1, wherein said forming tool has two cutting edges respectively provided on inner and outer side edges of a spiral groove in said tool, and the inner and outer side surfaces of said blank are processed simultaneously.

7. A method as claimed in claim 6, wherein before said cutting step the distance between cutting edges on both side edges of said groove in said tool is measured and said forming tool is rotated to be located in accordance with the measured distance.

8. An apparatus for processing a scroll member having a spiral wrap and an end plate integral with each other, characterized by comprising:
   a shaving tool having a spiral groove of the same configuration as said spiral wrap, and a cutting edge portion formed on at least one side edge of said groove over the entire length of said side edge;
   a tool supporting means for supporting said shaving tool;
   a blank supporting means for supporting a scroll blank such that said scroll blank opposes to said shaving tool;
   a means connected to said tool supporting means and adapted for imparting to said tool a pressing force necessary for the shaving; and
   an ultrasonic oscillation generating means adapted to impart an ultrasonic oscillation to said tool.

* * * * *